US008396096B2

(12) United States Patent
Noel et al.

(10) Patent No.: US 8,396,096 B2
(45) Date of Patent: Mar. 12, 2013

(54) COMMUNICATION RECEIVER WITH MULTIPLEXING OF RECEIVED SIGNAL, FOR RECEIVE SPACE DIVERSITY

(75) Inventors: Laurent Noel, Le Cannet (FR); Dominique Brunel, Antibes (FR)

(73) Assignee: ST-Ericsson SA, Geneva (CH)

( * ) Notice: Subject to any disclaimer, the term of this patent is extended or adjusted under 35 U.S.C. 154(b) by 824 days.

(21) Appl. No.: 12/439,513

(22) PCT Filed: Aug. 29, 2007

(86) PCT No.: PCT/IB2007/053478
§ 371 (c)(1),
(2), (4) Date: Oct. 9, 2009

(87) PCT Pub. No.: WO2008/026176
PCT Pub. Date: Mar. 6, 2008

(65) Prior Publication Data
US 2010/0067602 A1 Mar. 18, 2010

(30) Foreign Application Priority Data

Aug. 31, 2006 (EP) .................................... 06300906

(51) Int. Cl.
*H04B 1/00* (2006.01)
(52) U.S. Cl. ........ 375/148; 375/147; 375/140; 375/130; 375/316
(58) Field of Classification Search .................. 375/148, 375/147, 140, 130, 316
See application file for complete search history.

(56) References Cited

U.S. PATENT DOCUMENTS

| 5,237,586 | A  | * | 8/1993  | Bottomley ............... 370/206 |
| 6,301,294 | B1 | * | 10/2001 | Hara et al. ............... 375/152 |
| 6,377,613 | B1 | * | 4/2002  | Kawabe et al. ........... 375/142 |
| 7,466,743 | B2 | * | 12/2008 | Naguib .................... 375/144 |
| 7,817,744 | B2 | * | 10/2010 | Fukuoka et al. .......... 375/295 |
| 2004/0057538 | A1 | * | 3/2004 | Sathiavageeswaran et al. ..................... 375/350 |

FOREIGN PATENT DOCUMENTS

WO  03023996 A  3/2003

OTHER PUBLICATIONS

3GPP TS 25.101, 3rd Generation Partnership Project, Technical Specification Group Radio Access Network; User Equipment (UE) radio transmission and reception (FDD), TS 25.101 V7.7.0, Mar. 2007, 143 pgs.
PCT International Search Report PCT/IB2007/053478, mailing date, Feb. 28, 2008.

* cited by examiner

*Primary Examiner* — Kenneth Lam
(74) *Attorney, Agent, or Firm* — William J. Kubida; Peter J. Meza; Hogan Lovells US LLP

(57) ABSTRACT

A communication receiver implements receive space diversity to combine or select signals received from a same source on at least two spatially separated antennas in which the signals may vary in their fading characteristics at a given time. The receiver includes a RF processing module for down-converting and multiplexing the signals and a baseband processing module for converting the signals into digital signals, generating code sequences, producing despreaded and demultiplexed in-phase signals, and retrieving data initially contained within the received signals.

18 Claims, 2 Drawing Sheets

COMMUNICATION RECEIVER WITH MULTIPLEXING OF RECEIVED SIGNAL, FOR RECEIVE SPACE DIVERSITY

CROSS-REFERENCE TO RELATED ED APPLICATIONS

The present application relates to, and claims the benefit of and priority to, PCT Application PCT/IB2007/053478 filed Aug. 29, 2007, and of European Patent Application No. 06300906.2 filed Aug. 31, 2006, both of which are hereby incorporated by reference in their entireties for all purposes as if fully set forth herein.

FIELD OF THE INVENTION

The present invention relates to communication receivers, and more precisely to communication receivers implementing receive space diversity. One means here by "receive space diversity" which is the capability to combine or select signals received from a same source on at least two spatially separated antennas and which may vary in their fading characteristics at a given time.

BACKGROUND OF THE INVENTION

As it is known by one skilled in the relevant art, the use of multiple antennas (at least two) increases the performance of a radio link. For example, an additional second receive antenna can provide link diversity, and then immunity to multi-path propagation effects, such as fading, and interferences. Such a receive space diversity also improves the physical Bit-Error-Rate (or "BER") performance. A gain of 3 dB in Signal-to-Noise Ratio ("SNR") can be achieved when signals received from each antenna are uncorrelated; this leads to a still greater gain in terms of BER and Block Error Rate ("BLER") due to the non-linear behavior of the channel coding gain. So, it has been proposed to make use of receive space diversity in RF receivers, such as the ones used into mobile handsets (or telephones), and notably the in RF receivers adapted to release 7 of the 3gpp FDD_WCDMA standard) features.

Most of the receiver architectures that have been proposed to allow receive space diversity based on two (or more) antennas basically require the full duplication of the entire chain of reception, from each antenna all the way down to the rake receivers, including the two radio frequency ("RF") modules. More precisely, these known architectures propose the simple concatenation of i) two RF modules, comprising two low noise amplifiers (or "LNAs"), two pairs of quadrature down-mixers, two channel filters, two DC compensation loops, one RF local oscillator (or "LO") continuous wave synthesizer, ii) two pairs of analog to digital converters (or "ADCs"), iii) two pairs of FIR RRC filters, and iv) two rake receivers.

As the RF processing modules and the ADCs are the most power greedy parts of the receiver, this architecture is fairly power inefficient for two antennas and even more so for three or more antennas. Moreover such an architecture is not cost-effective.

SUMMARY OF THE INVENTION

One object of the present invention is to overcome at least partly the above mentioned drawbacks by offering a novel space diversity receiver architecture that saves power consumption and hardware interconnecting pins and/or improves overall analog RF performance and allows an integration into a single chip Direct Conversion Receiver ("DCR").

For this purpose, embodiments of the present invention provides a communication receiver, comprising:

at least first and second antennas for receiving respectively first and second radio frequency signals, a radio frequency processing module arranged i) for down-converting the first RF signals with first in-phase and quadrature local oscillator signals spread with a first analog code sequence, and the second RF signals with second in-phase and quadrature local oscillator signals spread with a second analog code sequence, and ii) for multiplexing the first and second down-converted in-phase signals to deliver a multiplexed down-converted in-phase signal and the first and second down-converted quadrature signals to deliver a multiplexed down-converted quadrature signal, and a baseband processing module arranged i) for converting the in-phase and quadrature multiplexed down-converted RF signals into in-phase and quadrature multiplexed digital signals, ii) for generating the first and second code sequences, iii) for producing at least first and third despreaded and demultiplexed in-phase signals and second and fourth despreaded and demultiplexed quadrature signals from the in-phase and quadrature multiplexed digital signals and the first and second code sequences, and iv) for retrieving data initially contained into the received first and second RF signals from the first and third despreaded and demultiplexed in-phase signals and second and fourth despreaded and demultiplexed quadrature signals.

The communication receiver according to the invention may include additional characteristics considered separately or combined, and notably:

its RF processing module may comprise at least i) first and second amplifiers respectively coupled to the first and second antennas, ii) a space diversity generator arranged for delivering the first in-phase and quadrature local oscillator signals spread with the first analog code sequence and the second in-phase and quadrature local oscillator signals respectively spread with the second analog code sequence, iii) at least first and second pairs of down-mixers, the first pair comprising first and second down-mixers coupled to the first amplifier and respectively fed with the first in-phase and quadrature local oscillator spread signals in order to down-convert the amplified first RF signals, and the second pair comprising third and fourth down-mixers coupled to the second amplifier and respectively fed with the second in-phase and quadrature local oscillator spread signals in order to down-convert the amplified second RF signals, iv) a first adder arranged for multiplexing the in-phase signals down-converted by the first and third down-mixers, and v) a second adder arranged for multiplexing the quadrature signals down-converted by the second and fourth down-mixers;

its baseband processing module may comprise i) first and second analog to digital converters for respectively converting the in-phase and quadrature multiplexed down-converted RF signals into the in-phase and quadrature multiplexed digital signals, ii) a sequence generation means arranged for generating digital versions of the first and second analog code sequences, iii) a despreading means arranged for delivering the first and third despreaded in-phase signals and the second and fourth despreaded quadrature signals from the in-phase and quadrature multiplexed digital signals and the first and second digital code sequences, iv) at least first and second rake receivers fed respectively with the first and third despreaded in-phase signals and the second and fourth despreaded quadrature signals in order to descramble, despread and demodulate signals received and downconverted from each antenna, v) a maximal ratio combiner connected to the output of the first and second rake receivers in order to combine signals demodulated from each antenna in a maximal ratio manner, and vi) an outer receiver connected to the output of the maximal ratio combiner and arranged for applying final error correction schemes and for demultiplexing associated control channels;

its baseband processing module may comprise at least first and second digital to analog converters arranged for converting respectively the first and second code sequences generated by the sequence generators into the first and second analog code sequences;

the space diversity generator may comprise first and second filters connected to the outputs of the first and second digital to analog converters and arranged for removing aliases products;

the space diversity generator may comprise i) a local oscillator generator arranged for delivering a local oscillator signal, ii) a divider arranged for dividing by 2 the local oscillator signal in order to output two local oscillator signals in quadrature onto first and second outputs, iii) a fifth mixer comprising a first input connected to the first output of the divider to be fed with the in-phase local oscillator signal, a second input for receiving the first analog code sequence, and an output to deliver the first in-phase local oscillator spread signal, iv) a sixth mixer comprising a first input connected to the second output of the divider to be fed with the quadrature local oscillator signal, a second input for receiving the first analog code sequence, and an output to deliver the first quadrature local oscillator spread signal, v) a seventh mixer comprising a first input connected to the first output of the divider to be fed with the in-phase local oscillator signal, a second input for receiving the second analog code sequence, and an output to deliver the second in-phase local oscillator spread signal, and vi) an eighth mixer comprising a first input connected to the second output of the divider to be fed with the quadrature local oscillator signal, a second input for receiving the second analog code sequence, and an output to deliver the second quadrature local oscillator spread signal;

the space diversity generator may also comprise an internal voltage control oscillator and a PLL loop filter for controlling the level of the local oscillator signal delivered by the local oscillator generator;

its RF processing module may comprise i) a first amplifier comprising an input connected to the output of the first down-mixer and an output connected to the first adder, ii) a second amplifier comprising an input connected to the output of the second down-mixer and an output connected to the second adder, iii) a third amplifier comprising an input connected to the output of the third down-mixer and an output connected to the first adder, and iv) a fourth amplifier comprising an input connected to the output of the fourth down-mixer and an output connected to the second adder;

its RF processing module may comprise i) a first process module comprising an input connected to the output of the first adder and an output, and arranged for carrying out a channel filtering and a DC compensation loop onto the in-phase multiplexed signal outputted by the first adder, ii) a fifth amplifier comprising an input connected to the output of the first process module and an output, and arranged for amplifying the in-phase multiplexed signal outputted by the first process module, iii) a second process module comprising an input connected to the output of the second adder and an output, and arranged for carrying out a channel filtering and a DC compensation loop onto the quadrature multiplexed signal outputted by the second adder, and iv) a sixth amplifier comprising an input connected to the output of the second process module and an output, and arranged for amplifying the quadrature multiplexed signal outputted by the second process module;

its baseband processing module may comprise an automatic gain control module arranged for controlling the amplification gains of the fifth and sixth amplifiers;

the despreading means may comprise i) a first digital multiplier comprising a first input connected to the output of the first analog to digital converter, a second input connected to an output of the first generator for receiving the first digital code sequence, and an output for delivering the first despreaded and demultiplexed in-phase signal, ii) a first integrate and dump stage comprising an input connected to the output of the first digital multiplier and an output, iii) a second digital multiplier comprising a first input connected to the output of the second analog to digital converter, a second input connected to an output of the first generator for receiving the first digital code sequence, and an output for delivering a second despreaded and demultiplexed quadrature signal, iv) a second integrate and dump stage comprising an input connected to the output of the second digital multiplier and an output, v) a third digital multiplier comprising a first input connected to the output of the first analog to digital converter, a second input connected to an output of the second generator for receiving the second digital code sequence, and an output for delivering the third despreaded and demultiplexed in-phase signal, vi) a third integrate and dump stage comprising an input connected to the output of the third digital multiplier and an output, vii) a fourth digital multiplier comprising a first input connected to the output of the second analog to digital converter, a second input connected to an output of the second generator for receiving the second digital code sequence, and an output for delivering the fourth despreaded and demultiplexed quadrature signal, and viii) a fourth integrate and dump stage comprising an input connected to the output of the fourth digital multiplier and an output;

the despreading means may comprise i) first and second delay means inserted respectively between the output of the first and second generators and the second output of the first and second digital multipliers and the third and fourth digital multipliers, and arranged for aligning in the time-domain the codes of the first and second code sequences, and ii) a correlation peak detector for triggering the time alignment in order the peaks delivered by the outputs of the first and second integrate and dump stages exceed a predetermined threshold;

the sequence generation means may comprise digital FIR filters arranged respectively for carrying out an RRC filtering on the first and second digital code sequences.

The present invention is equally compatible with a piece of communication equipment comprising a communication receiver such as the one introduced above.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

Other features and advantages of the invention will become apparent on examining the detailed specifications hereafter and the appended drawings, wherein.

Figure 1:
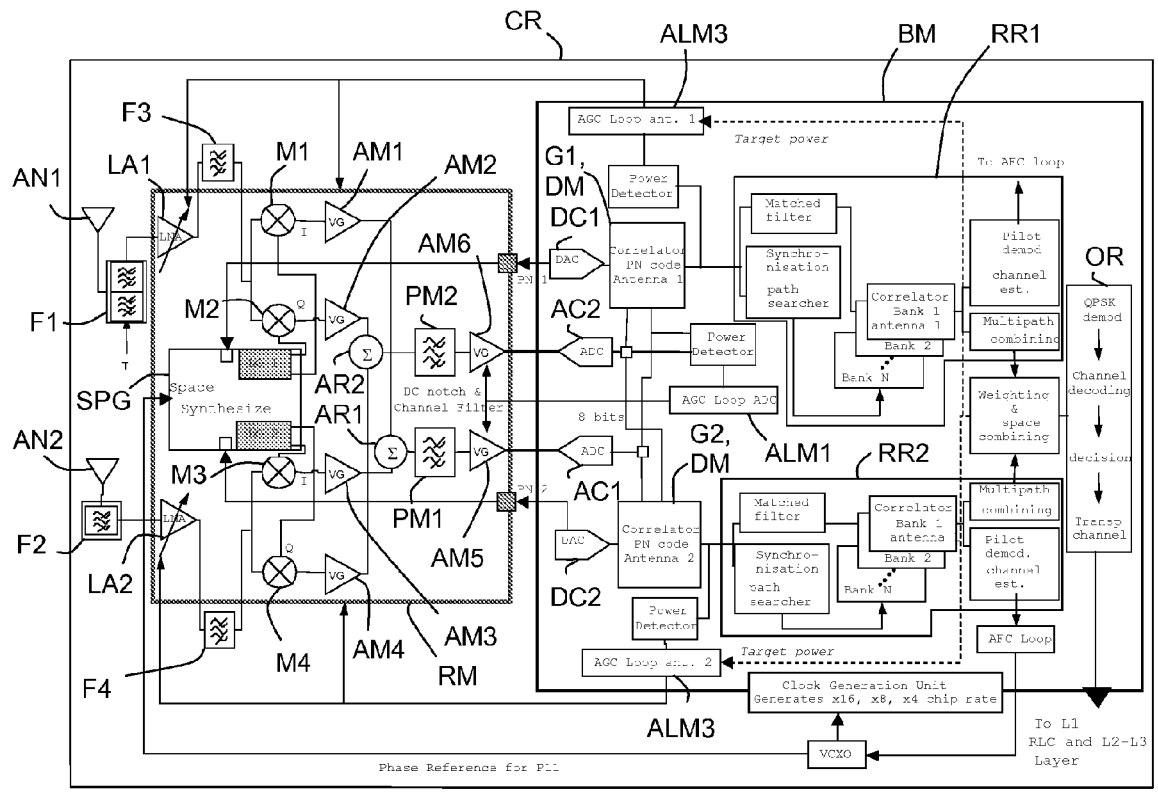
FIG. 1 schematically and functionally illustrates an example of embodiment of a communication receiver according to one embodiment of the present invention.

The appended drawings may not only serve to complete the invention, but also to contribute to its definition. The Figures depict embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Reference is initially made to FIG. 1 to describe an example of communication receiver CR according to the invention. Such a communication receiver CR may be installed into any (tele)communication equipment, mobile (or cellular) or not, adapted to radio communication (at least in reception) in a network implementing receive space diversity, and notably in WiFi and WiMax networks. Therefore the communication receiver CR may be installed in a fixed or mobile telephone (or handset), a fixed or mobile computer, a personal digital assistant ("PDA"), a game or audio or video player, a television, a set-top box, a base station ("BTS" or Node B of a radio access network of a mobile (or cellular) network), a cellular repeater, or any product (or equipment) which requires reception of radio signals (such as remote base stations, wireless local loop, Wireless LAN modem), for instance. The architecture offered by the invention is applicable to any telecommunication standard known in the art concerning a single antenna solution.

In the following description it will be considered that the communication receiver CR comprises two antennas. But, as will be recognized by one skilled in the relevant art, the present invention applies equally to communication receiver CR comprising two or more antennas.

Moreover, in the following description it will be considered that the communication receiver CR is adapted to receive signals belonging to the UMTS frequency band I (1920-1980 MHz/2110-2170 MHz). But the invention applies to any radio frequency band and notably applies equally to the currently published 10 frequency bands of the 3gpp standard (TS 25.101 release 7).

The invention only concerns the processing of the received signals by the communication receiver CR and not the possible signals generated by the communication transmitter that the communication equipment may possibly comprise.

As schematically illustrated in FIG. 1, a communication receiver CR according to the invention comprises first AN1 and second AN2 antennas, for receiving (and possibly transmitting) radio signals, a single radio frequency (RF) processing module RM and a (digital) baseband processing module BM.

One skilled in the art will recall that in an UMTS network implementing receive space diversity, a base station (Node B) transmits, to a mobile telephone, first signals representative S1 of first IS1 and second IS2 symbols (of information) that are received by a first antenna AN1 with a first channel coefficient ga. Furthermore second signals S2 are also representative of the first IS1 and second IS2 symbols but are received by a second antenna AN2 with a second channel coefficient gb. Therefore, the first antenna AN1 of the communication receiver CR is arranged to receive the first signals (S1=IS1 ⊗ ga+S2 ⊗ ga) while the second antenna AN2 of this communication receiver CR is arranged to receive the second signals (S2=IS1 ⊗ gb+S2 ⊗ gb).

The baseband processing module BM comprises only one pair of analog to digital converters AC1 and AC2 to acquire and sample the analog RF signals S1 and S2 coming from the two antenna AN1 and AN2. According to one embodiment, the present invention proposes to multiplex these analog RF signals S1 and S2.

Various techniques as would be known to one skilled in the art can be used to multiplex the analog RF signals S1 and S2 without departing from the scope and spirit of the present invention. In the following description it will be considered that the multiplexing is based on a standard direct sequence spread spectrum communication technique (or Code Division Multiplexing ("CDM")). It is recalled that CDM is used in Code Division Multiple Access ("CDMA") networks and comprises sharing a common carrier frequency (or part of the RF spectrum) amongst many users by using orthogonal codes (for instance of the Gold type) to separate/distinguish or multiplex each user's data while guaranteeing adequate signal ratio to each user. In a cellular network, CDMA therefore shares the RF spectrum using a chosen spreading code dedicated to each individual user located in a cell.

One embodiment of the present invention spreads the RF signals S1 and S2 picked by the antennas AN1 and AN2 with different and dedicated orthogonal spreading sequences. These spreadings must occur as close to each antenna AN1, AN2 as possible. As explained below, the despreading is performed just after the ADCs AC1 and AC2 to allow digital signal processing to be performed on each antenna signal. The multiplexing of the present invention differs from the one implemented in a conventional cellular network such as the one used in UMTS or IS-95 networks. Indeed, the propagation between the spreading means and the despreading means DM of the present invention is done by means of an electrical line so that the delay between the spreading means and the dispreading means is constant. Once a signal is acquired the propagation does not vary in time, as is the case in a cell due to the fact that propagation depends on the distance between the base station and the mobile telephone which constantly varies when the user is moving. Therefore, the acquisition and tracking of the correlation peaks/synchronization of local pseudo-noise code sequences is much simpler in a communication receiver CR according to the present invention than in a conventional cellular (W)CDMA network (notably it does not require the use of delay locked loops (DLLs).

Moreover, in a communication receiver CR according to one embodiment of the present invention the propagation does not suffer from multi-path fading and interferences which, depending on the coherence bandwidth of the transmission channel, may degrade the signal to noise ratio ("SNR"). Therefore, in a communication receiver CR according to the invention the pseudo-noise code sequences used to multiplex the signals S1 and S2 received by the antennas AN1, AN2 do not loose their orthogonal properties.

Moreover, in a communication receiver CR, according to one embodiment of the present invention, the only external added noise sources are the internal thermal noise sources. In contrast, while in a CMDA cell, codes from other users may degrade the SNR of a wanted code by loosing their orthogonal properties through multi-path transmissions. Therefore, the SNR present at the output of an antenna according to the present invention is not significantly degraded after despreading.

In addition to its antennas AN1 and AN2, a communication receiver CR, according to embodiments of the present invention, comprises a radio frequency (RF) processing module RM and a baseband processing module BM.

The radio frequency (RF) processing module RF is arranged i) for down-converting the received first RF signals with first in-phase (I) and quadrature (Q) local oscillator signals spread with a first analog code sequence, and the received second RF signals with second in-phase and quadrature local oscillator signals spread with a second analog code sequence, and ii) for multiplexing the first and second down-converted in-phase signals to deliver a multiplexed down-converted in-phase signal and the first and second down-converted quadrature signals to deliver a multiplexed down-converted quadrature signal.

The baseband processing module BM is arranged i) for converting the in-phase and quadrature multiplexed down-converted RF signals into in-phase and quadrature multiplexed digital signals, ii) for generating the first and second code sequences, iii) for producing at least first and third despreaded and demultiplexed in-phase signals and second and fourth despreaded and demultiplexed quadrature signals from the in-phase and quadrature multiplexed digital signals and the first and second code sequences, and iv) for retrieving data initially contained into the received first and second RF signals from the first and third despreaded and demultiplexed in-phase signals and second and fourth despreaded and demultiplexed quadrature signals.

In the non limiting example of embodiment illustrated in FIG. 1, the RF processing module RM firstly comprises a first low noise amplifier L1 coupled to the first antenna AN1. As illustrated, this coupling is preferably done through a first external filter F1. Since the invention only concerns space diversity in reception, this first external filter F1 can be a duplexer to mitigate the modulated uplink (UL) signal generated by the RF transmitter chain of the communication equipment which comprises the communication receiver CR.

The RF processing module RM also comprises a second low noise amplifier L2 coupled to the second antenna AN2. As illustrated, this coupling is preferably done through a second external filter F2. Since the first external filter F1 is a duplexer F1, the second external filter F2 can be a simple bandpass filter designed to cover the reception band in order to filter out any possible transmission leakage that could be coupled via the port of the second antenna AN2.

The RF processing module RM further comprises a multiplexing means coupled to the output of the first L1 and second L2 LNAs. As illustrated, these couplings can be done through third F3 and fourth F4 external filters, for instance of the saw type.

One should note that the third F3 and fourth F4 external filters are solely used to reduce IIp2 requirements of the down-mixers M1/M2 and M3/M4 described hereafter. Indeed, it has been proven that an advanced mixer driving technique can significantly enhance mixers IIp2 performance. Therefore these filters may or may not be used, depending on the intrinsic mixer's IIp2 performance. Their use may also depend on the type of spreading sequence family that is used. So, these filters F3 and F4 are only sketched in this embodiment for illustrative purposes.

According to one embodiment of the present invention, the multiplexing means firstly comprises first M1 and second M2 down-mixers each having a first input coupled to the output of the first LNA L1 (possibly through the third external filter F3), a second input connected respectively to first and second outputs of a space diversity generator SDG, and an output. The first down-mixer M1 is dedicated to down-converting and in-phase (I) spreading of the first received signals S1, while the second down-mixer M2 is dedicated to down-converting and quadrature (Q) spreading of the first received signals S1.

The multiplexing means also comprises third M3 and fourth M4 down-mixers each having a first input coupled to the output of the second LNA L2 (possibly through the fourth external filter F4), a second input connected respectively to third and fourth outputs of the space diversity generator SDG, and an output. The third down-mixer M3 is dedicated to down-converting and in-phase (I) spreading of the second received signals S2 while the second down-mixer M2 is dedicated to down-converting and quadrature (Q) spreading of the second received signals S2.

The space diversity generator SDG is intended for feeding on the one hand the first M1 and second M2 down-mixers with first and second local oscillator spread signals that are in quadrature (I, Q) and that are both spread with a same first analog pseudo-noise code sequence, and on the other hand the third M3 and fourth M4 down-mixers with third and fourth local oscillator spread signals that are in quadrature (I, Q) and that are both spread with a same second analog pseudo-noise code sequence. The first and second analog pseudo-noise code sequences are provided by the baseband processing module BM. More precisely, the baseband processing module BM comprises first G1 and second G2 generators intended for generating first PN1 and second PN2 digital pseudo-noise code sequences which are respectively converted into the first and second analog pseudo-noise code sequences by first DC1 and second DC2 digital to analog converters (DACs).

Figure 2:
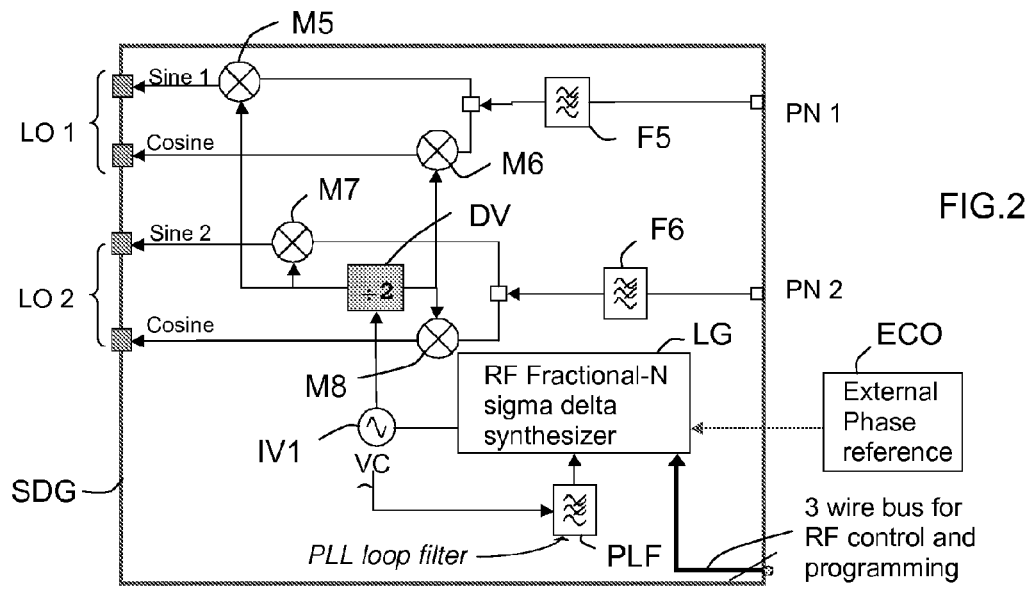
FIG. 2 schematically and functionally illustrates an example of one embodiment of a space diversity generator which can be part of the RF processing module of the communication receiver illustrated in FIG. 1, according to the present invention, and FIG. 3 schematically and functionally illustrates an example of one embodiment of first and second (code sequence) generators and of a dispreading means which can be part of the baseband processing module of the communication receiver of the present invention illustrated in FIG. 1.

Another non-limiting example of a space diversity generator SDG according to the present invention is illustrated in FIG. 2.

In this example, with reference to FIG. 2, the space diversity generator SDG comprises first F5 and second F6 filters connected to the outputs of the first DC1 and second DC2 DACs. These first F5 and second F6 filters are preferably analog anti-aliases low-pass filters intended for removing aliases products prior to the local oscillator (LO) spreading. It is important that aliases products and DAC quantization noise floor be rejected as much as possible to avoid down-mixing of any blockers present at the antenna level. The selection of the low-pass filter design depends on the chosen sampling frequency, the use or not of digital interpolation filter in the first G1 and second G2 generators, the resolution of the first DC1 and second DC2 DACs (i.e. the quantization noise floor), the blocker rejection specification, and the resolution of the first AC1 and second AC2 ADCs. This selection aims at ensuring that the LO spread reaches a noise floor as close to thermal noise (at the lowest possible frequency offset from the edge of the wanted carrier) as possible.

The space diversity generator SDG further comprises a local oscillator generator LG, which may be a fractional-N sigma delta synthesizer acting as a Phase Locked Loop ("PLL"), such as the ones used for example by Philips Semiconductor® into its RF transceivers referenced UAA3580/UAA3581/UAA3582/UAA358x. This local oscillator generator LG is preferably phase-locked onto an external phase reference provided by an external crystal oscillator ECO. The level of the local oscillator signal output by the local oscillator generator LG is preferably controlled by an internal voltage control oscillator (VCO) IV1 and a PLL loop filter PLF. The VCO can be the one used in the UMTS UAA3582 transceivers of Philips Semiconductor, which run at twice the carrier frequency (i.e. 4220 4340 MHz in case of UMTS band I) to prevent from VCO remodulation effects.

The space diversity generator SDG further comprises a divider DV intended for dividing by 2 the local oscillator signal outputted by the local oscillator generator LG, in order to output two local oscillator signals in quadrature on first and second outputs. For instance, this divider DV can be the one used in the UMTS transceiver.

The space diversity generator SDG further comprises fifth M5, sixth M6, seventh M7 and eighth M8 mixers, according to another embodiment of the present invention. The fifth mixer M5 comprises a first input connected to the first output of the divider DV to be fed with the in-phase (I) local oscillator signal, a second input coupled to the output of the first DAC DC1 to be fed with the first analog pseudo-noise code sequence, and an output to deliver the first in-phase local oscillator spread signal intended for feeding the second input of the first mixer M1.

The sixth mixer M6 comprises a first input connected to the second output of the divider DV to be fed with the quadrature (Q) local oscillator signal, a second input coupled to the output of the first DAC DC1 to be fed with the first analog pseudo-noise code sequence, and an output to deliver the first quadrature local oscillator spread signal intended for feeding the second input of the second mixer M2.

The seventh mixer M7 comprises a first input connected to the first output of the divider DV to be fed with the in-phase local oscillator signal, a second input coupled to the output of the second DAC DC2 to be fed with the second analog pseudo-noise code sequence, and an output to deliver the second in-phase (I) local oscillator spread signal intended for feeding the second input of the third mixer M.

The eighth mixer M8 comprises a first input connected to the second output of the divider DV to be fed with the quadrature (Q) local oscillator signal, a second input coupled to the output of the second DAC DC2 to be fed with the second analog pseudo-noise code sequence, and an output to deliver the second quadrature local oscillator spread signal intended for feeding the second input of the fourth mixer M4.

The in-phase and quadrature components of the LO signals can be spread by means of the simplest form of modulation which is dual-bpsk (it consists in applying identical analog pseudo-noise code chips onto two identical up-mixers). This implies that the pseudo-noise code 3 dB bandwidth must be identical to the one of the UMTS modulated carrier received by the antenna AN1 and AN2, i.e. 3.84 MHz, RRC filtered with a roll-off of 0.22. It is important to notice that chip rate higher than the one offered by a dual-bpsk modulation can be used. For example, with a QPSK modulation the chip rate can be doubled, and with a 16 QAM modulation the chip rate can be multiplied by 4 and yet still occupy the same bandwidth as the one of the original carrier received by the antennas AN1 and AN2. The use of a dual-bpsk modulation for spreading allows to simplify the dispreading means, since identical symbols are present on the I and Q branches.

The multiplexing means preferably further comprises first AM1, second AM2, third AM3 and fourth AM4 amplifiers, such as voltage gain amplifiers (VGAs) for instance. The first amplifier AM1 comprises an input connected to the output of the first down-mixer M1 and an output, the second amplifier AM2 comprises an input connected to the output of the second down-mixer M2 and an output, the third amplifier AM3 comprises an input connected to the output of the third down-mixer M3 and an output, and the fourth amplifier AM4 comprises an input connected to the output of the fourth down-mixer M4 and an output.

It is important to notice that the control mechanism of the amplifiers AM1-AM4 is not constrained in this invention. Any automatic gain control (AGC) loop may be used to implement the present invention, and notably for example a common control word for each chain (i.e. applying a same gain control word for each antenna in the communication receiver CR) and specific gain control words in the digital domain, with the use of scalers SR1-SR4 in the despreading means DM (described below), can be used.

The multiplexing means further comprises first AR1 and second AR2 adders, such as voltage adders, for instance. The first adder AR1 comprises first and second inputs respectively connected to the outputs of the first AM1 and third AM3 amplifiers. So, it is intended for combining the first and second in-phase signals that have been respectively down-converted (and spread) by the first M1 and third M3 down-mixers in order to output an in-phase multiplexed signal. The second adder AR2 comprises first and second inputs respectively connected to the outputs of the second AM2 and fourth AM4 amplifiers. So, it is intended for combining the first and second quadrature signals that have been respectively down-converted (and spread) by the second M2 and fourth M4 down-mixers in order to output a quadrature multiplexed signal.

Once down-converted (and spread) and multiplexed in the code domain, the analog signals received by the antennas AN1 and AN2 occupy the same bandwith as the one of a single UMTS carrier. Therefore, automatic gain control (AGC), channel filtering and DC compensation loops can be provided at the outputs of the first AR1 and second AR2 adders. For this purpose, the RF processing module RM further comprises first PM1 and second PM2 process modules and fifth AM5 and sixth AM6 amplifiers, such as voltage gain amplifiers (VGAs) for instance.

The first process module PM1 comprises an input connected to the output of the first adder AR1, and an output. The first process module PM1 is intended for carrying out a channel filtering and a DC compensation loop onto the in-phase multiplexed signal outputted by the first adder AR1. The fifth amplifier AM5 comprises an input connected to the output of the first process module PM1 and an output. The fifth amplifier AM5 is intended for amplifying the in-phase multiplexed signal outputted by the first process module PM1 under control of a first automatic gain control (AGC) module ALM1 of the baseband processing module BM. The first process module PM1 and the fifth amplifier AM5 constitutes the in-phase (I) branch of the RF processing module RM.

The second process module PM2 comprises an input connected to the output of the second adder AR2, and an output. The second process module PM2 is intended for carrying out a channel filtering and a DC compensation loop onto the quadrature multiplexed signal outputted by the second adder AR2. The sixth amplifier AM6 comprises an input connected to the output of the second process module PM2 and an output and is intended for amplifying the quadrature multiplexed signal outputted by the second process module PM2 under control of the automatic gain control (AGC) module ALM1. The second process module PM2 and the sixth amplifier AM6 constitutes the quadrature (Q) branch of the RF processing module RM.

The first PM1 and second PM2 process modules and the fifth AM5 and sixth AM6 amplifiers can be the ones used in the UMTS UAA3582/UAA3580 transceivers of Philips Semiconductor®.

With additional reference to FIG. 1, the baseband processing module BM comprises the first AC1 and second AC2 ADCs whose inputs are respectively connected to the I and Q branches of the RF processing module RM, and more precisely to the outputs of the fifth AM5 and sixth AM6 amplifiers, and the first DC1 and second DC2 DACs whose outputs are respectively connected to inputs of the space diversity generator SDG.

The inputs of the first DC1 and second DC2 DACs are respectively connected to outputs of the first G1 and second G2 generators. As mentioned before, the first G1 and second G2 generators generate the first PN1 and second PN2 digital pseudo-noise code sequences that are used (after the DAC conversion) for spreading the local oscillator signals.

The choice of the length of the digital pseudo-noise code sequences PN1 and PN2 depends on the level of modulation implemented in the space diversity generator SDG. For instance, for a dual-bpsk spreading (or modulation) with a processing gain (PG) of 0 dB, a 38400 chip long code sequence per 10 ms frame is required with an oversampling by 8 at 30.72 MHz, for a QPSK spreading (or modulation) with a PG of 3 dB, a 76800 chip long code sequence per 10 ms frame is required with an oversampling by 4 at 30.72 MHz, and for a 16 QAM spreading (or modulation) with a PG of 6 dB, a 153600 chip long code sequence per 10 ms frame is required with an oversampling by 2 at 30.72 MHz. It is recalled that the processing gain (PG) is the ratio of the number of chips contained in a 10 ms frame received by each antenna and the number of chips contained in a 10 ms frame in each PN sequence (PN1 and PN2). The gain is expressed in decibels.

The use of higher level of modulation provides better SNR but is more expensive because it requires a new design selection of the anti-aliasing filters (first F5 and second F6 filters of the space diversity generator SDG), the addition of a bit to symbol mapping block, and a more complex despreading means DM.

The spreading codes used to generate the sequences have preferably a maximal length in order to present good auto-correlation properties and near optimal cross correlation properties. For instance, one can use the GOLD codes. But, other code families can be used, and notably the one(s) allowing to do not make use of FIR filters, or the one(s) offering a constant envelope during spreading and despreading (the GOLD code envelope is no longer constant after a FIR RRC filtering), or else the one(s) allowing the use of 76800 chip long sequences every 10 ms frame while occupying the same 3.84 MHz bandwidth.

Figure 3:
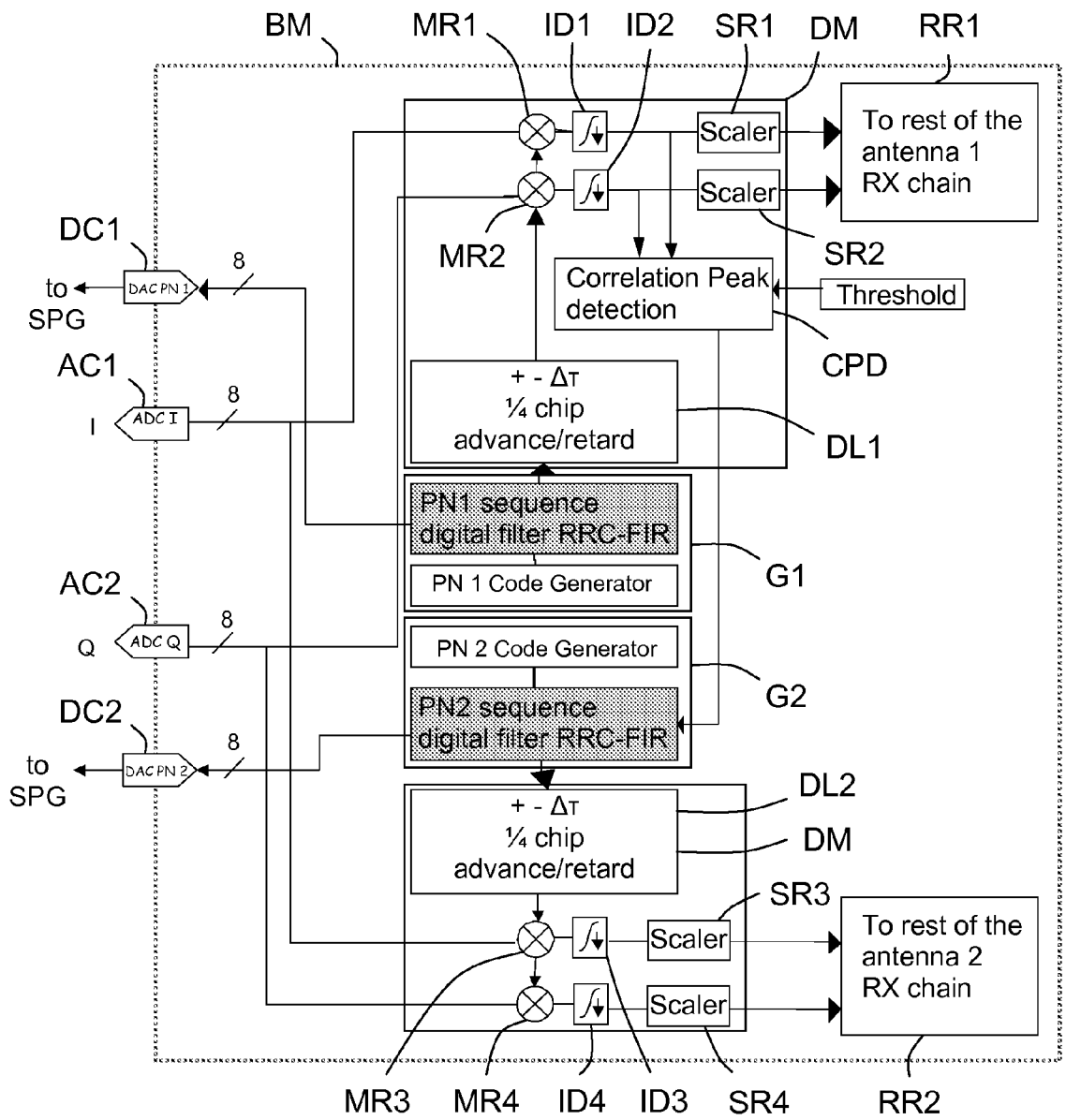

As illustrated in FIG. 3, each generator G1, G2 may comprise a digital filter (block in grey), such as a FIR filter for instance, intended for carrying out an RRC filtering on the generated digital pseudo-noise code sequence PN1, PN2, according to one embodiment of the present invention. This is notably useful when the generated spreading codes are Gold codes. But, such filters can be omitted into the generators G1 and G2 when the latter are used to generate spreading codes belonging to another type of family, such as the one called FZC ("Frank-Zadoff-Chu").

The polyphase complex FZC spreading code sequences present several advantages compared to conventional Gold codes, maximal length or even Walsh codes, that can allow to simplify the architecture of the communication receiver CR according to the invention, and notably its baseband processing module BM.

It is recalled that, by nature, FZC code sequences have a constant envelope and therefore do not present peak to mean or large peak to average ratio as it is the case in the conventional code sequences. This allows relaxing the linearity requirements of all components to be used in the analog spreading processing blocks. In other words, ideally, the code sequences are CAZAC ("Constant Amplitude Zero Auto-Correlation") code sequences, which exhibits zero periodic auto-correlation for off-zero lags, while presenting constant envelope properties.

Moreover, by nature, FZC code sequences do not require any form of digital filtering. This allows the FZC code sequences to not make use of filters into the generators G1 and G2, which therefore saves integrated circuit (IC) die area and reduces the power consumption of the generators G1 and G2 (illustrated in FIG. 3). The filters F5 and F6 of the space diversity generator SDG still need to be implemented to remove aliases produced intrinsically in the DAC DC1 and DC2.

For any given cross-correlation (CC) requirement, the FZC family can offer a sequence set with auto-correlation (AC) values superior to the existing one (equivalent odd and even (EOE) correlation Gold sequences or even Kasami sequences). The wide range of CC values available, coupled with the ease of generating large numbers of sequence sets, allows to choose code sequences that have the best combination of CC and AC properties for a given application.

Finally, by their polyphase nature, FZC code sequences can be generated with a baseband complex modulator (simplified generator G1, G2). Therefore, the output of each DAC DC1, DC2 delivers a single side-band complex baseband signal. This results from the fact that a complex FZC code sequence is not centered at 0 Hertz, i.e. it does not contain any spectral component down to DC (these chirps are by nature centred on a low Intermediate Frequency (low IF)—the value of this low IF depends on the length of the code sequence, the sequence set size, and the sampling frequency). Therefore, by programming the local oscillator generator (or PLL) LG so that the VCO IV1 is operating at a direct multiple integer of the carrier frequency (for example 2 times fo, where fo designates the carrier frequency of the signal present at the antenna port), the spreading operation through mixers M1 to M4 results in low IF quadrature I and Q signals. This allows to do not make use of a low cut-off frequency DC offset compensation loop, and therefore induces a DC settling time system which is much faster than the one in a conventional zero IF architecture. But, this requires to replace the channel filters PM2 and PM1 with polyphase complex filters. Once sampled by the ADCs AC1 and AC2, the low IF digital I/Q signals are converted back to their original baseband content via despreading operation of the low IF FZC code sequence. This also improves overall IIp2 performance of the RF communication receiver CR.

The outputs of the first AC1 and second AC2 ADCs are connected to the despreading means DM. A non limiting example of one embodiment of the present invention regarding despreading means DM is illustrated in FIG. 3.

In this example, the despreading means DM comprises first MR1, second MR2, third MR3 and fourth MR4 digital multipliers, such as logical XOR gates for instance, and first ID1, second ID2, third ID3 and fourth ID4 integrate and dump stages.

The first digital multiplier MR1 comprises a first input connected to the output of the first ADC AC1, a second input connected to an output of the first generator G1 to receive the first digital pseudo-noise code sequence PN1, and an output connected to the input of the first integrate and dump stage ID1 and provided for delivering a first despreaded and demultiplexed I signal.

The second digital multiplier MR2 comprises a first input connected to the output of the second ADC AC2, a second input connected to an output of the first generator G1 to receive the first digital pseudo-noise code sequence PN1, and an output connected to the input of the second integrate and dump stage ID2 and provided for delivering a second despreaded and demultiplexed Q signal.

The third digital multiplier MR3 comprises a first input connected to the output of the first ADC AC1, a second input connected to an output of the second generator G2 to receive the second digital pseudo-noise code sequence PN2, and an output connected to the input of the third integrate and dump stage ID3 and provided for delivering a third despreaded and demultiplexed I signal.

The fourth digital multiplier MR4 comprises a first input connected to the output of the second ADC AC2, a second input connected to an output of the second generator G2 to receive the second digital pseudo-noise code sequence PN2, and an output connected to the input of the fourth integrate and dump stage ID4 and provided for delivering a fourth despreaded and demultiplexed Q signal.

Before the despreading operation takes place into the digital multipliers MR1 to MR4, the codes of the digital pseudo-noise code sequences PN1 and PN2 are preferably aligned in the time-domain to obtain a maximum correlation peak. This initial timing alignment sequence can be triggered by a correlation peak detector CPD which uses delay lines DL1 and DL2 to shift the pseudo-noise codes by ¼ chip steps until the peaks (delivered by the outputs of the first ID1 and second ID2 integrate and dump stages) exceed a predetermined threshold.

Contrary to conventional spread spectrum communication receivers, there is no need for a delay-locked loops (DLLs) since once the correct timing alignment is found, the timing delay does not vary due to the nature of the transmission line between the spreading means and the despreading means. Therefore this timing alignment can take place at initial calibration of the communication receiver CR.

The despreading means DM may further comprise first SR1, second SR2, third SR3 and fourth SR4 scalers having inputs respectively connected to the outputs of the first ID1, second ID2, third ID3 and fourth ID4 integrate and dump stages. These scalers SR1-SR4 are used to apply specific digital gain for each received antenna signals. This allows to simplify the analog control mechanism of the RF receiver amplifiers AM1-AM4, whereby a unique gain could be applied in the analog domain, and separate digital gain in the scalers SR1-SR4. The use of these scalers SR1-SR4 is only an implementation choice, which depends on the coding architecture of the AGC loop and the processing gain (PG) implemented in the invention. The higher the PG, the less sensitive the architecture to apply a common analog gain setting for each signal received by an antenna. For implementations with 0 dB PG, a more complex combined analog and digital AGC loop must be implemented in order to maintain the orthogonal nature of each received spreaded signal by the baseband processing block.

Although it is not illustrated in FIGS. 1 and 3, the baseband processing module BM may also comprise digital filter(s), such as FIR filter(s) for instance, intended for carrying out an RRC filtering on the despreaded I and Q signals outputted by the despreading means DM.

As illustrated in FIG. 1, the remaining (RX) part of the baseband processing module BM, which is intended for processing in baseband the despreaded and demultiplexed I and Q signals outputted by the despreading means DM, is conventional. So it will not be described in details hereafter. This remaining part essentially comprises, a number of rake receivers RR1 and RR2 equal to the number of antennas AN1 and AN2, a maximal ratio combiner RC and an outer receiver OR. Other types of remaining part may be used.

In the illustrated example, the first rake receiver RR1 is fed with the first despreaded and demultiplexed in-phase signal and the second despreaded and demultiplexed quadrature signal, while the second rake receiver RR2 is fed with the third despreaded and demultiplexed in-phase signal and the fourth despreaded and demultiplexed quadrature signal. Each rake receiver RR1, RR2 is arranged for implementing the conventional steps that are necessary to demodulate a WCDMA signal (as defined in TS 25.101 release 99), i.e. synchronisation establishment, cell search and scrambling code identification, channel estimation, allocation of rake fingers according to the number of cells found and channel impulse response. The list of steps mentioned above is not exhaustive and is not specific to the invention. It is only one possible implementation of the demodulation of release 99 UMTS complex baseband signals. Other architectures may for example make use of chip level equalizers to perform these signal processing steps. More generally, the invention introduces complex baseband chips which can be processed by any known technique capable of producing performances conformant with the performance requirement documents of the 3gpp standard (TS 25.191—accessible at the Internet address "www.3gpp.org").

The maximal ratio combiner RC is connected to the output of the first RR1 and second RR2 rake receivers in order to combine signals descrambled and despreaded from each antenna in a maximal ratio manner. It is not specific to the invention and is only presented for illustration purpose.

The outer receiver OR is connected to the output of the maximal ratio combiner RC in order to perform last stages of demodulation, including, but not limited to, error correction, CRC checks, demultiplexing, de-interleaving and rate matching of either dedicated physical channel bits or control channel information bits.

The baseband processing module BM also notably comprises the first automatic gain control (AGC) module ALM1, and second ALM2 and third ALM3 automatic gain control modules. This second automatic gain control module ALM2 is provided for controlling the amplification gain of the first low noise amplifier LA1 and the first AM1 and second AM2 amplifiers (of the multiplexing means), while the third automatic gain control module ALM3 is provided for controlling the amplification gain of the second low noise amplifier LA2 and the third AM3 and fourth AM4 amplifiers (of the multiplexing means).

The RF processing module RM and the baseband processing module BM may be separated or shared integrated circuit(s) (IC) realized in CMOS technology or in any technology used in chip industry fabrication. For instance, at least the RF processing module RM and the baseband processing module BM can be integrated into a single chip Direct Conversion Receiver (DCR).

Embodiments of the present invention can significantly reduce power consumption and significantly save the number of pins, which in return induces a cost reduction.

According to one embodiment of the present invention an important channel power rejection can be obtained (typically of the order of 60 dB) which offers an extra margin to the receiver designers either to further simplify the channel filters, or to optimize the number of bits implemented in the ADCs. Both of these cases lead to an additional power consumption reduction of the communication receiver.

The present invention is not limited to the embodiments of communication receiver and communication equipment described above, only as examples, but it encompasses all alternative embodiments that may be considered by one skilled in the relevant art within the scope of the claims hereafter.

In the preceding description it has been described an example of embodiment of a communication receiver comprising only two antennas. But the invention applies to any communication receiver comprising two or more antennas. It is also important to note that whatever the number of antennas, the number of ADCs and of adders (and therefore of I and Q branches) always remains equal to two. One skilled in the relevant art will note that the power consumption gain and the saving of interconnecting pins increase approximately linearly with the number of antennas used.

The invention claimed is:

1. A communication receiver comprising:
at least first and second antennas for receiving respectively first and second Radio Frequency (RF) signals;
a RF processing module operable i) to down-convert the first RF signal with first in-phase and quadrature local oscillator signals spread with a first analog code sequence and the second RF signal with second in-phase and quadrature local oscillator signals spread with a second analog code sequence, and ii) to multiplex said first and second down-converted in-phase signals to deliver a multiplexed down-converted in-phase signal and said first and second down-converted quadrature signals to deliver a multiplexed down-converted quadrature signal; and
a baseband processing module operable i) to convert said in-phase and quadrature multiplexed down-converted RF signals into in-phase and quadrature multiplexed digital signals, ii) to generate said first and second analog code sequences, iii) to produce at least first and third despreaded and demultiplexed in-phase signals and second and fourth despreaded and demultiplexed quadrature signals from said in-phase and quadrature multiplexed digital signals and said first and second analog code sequences, and iv) to retrieve data within said received first and second RF signals from said first and third despreaded and demultiplexed in-phase signals and second and fourth despreaded and demultiplexed quadrature signals.

2. The communication receiver according to claim 1, wherein said RF processing module comprises at least i) first and second amplifiers respectively coupled to the first and second antennas, ii) a space diversity generator operable to deliver said first in-phase and quadrature local oscillator signals spread with said first analog code sequence and said second in-phase and quadrature local oscillator signals respectively spread with said second analog code sequence, iii) at least first and second pairs of down-mixers, said first pair comprising first and second down-mixers coupled to the first amplifier and respectively fed with the first in-phase and quadrature local oscillator spread signals in order to down-convert the amplified first RF signals, and said second pair comprising third and fourth down-mixers coupled to the second amplifier and respectively fed with the second in-phase and quadrature local oscillator spread signals in order to down-convert the amplified second RF signals, iv) a first adder operable to multiplex said in-phase signals down-converted by the first and third down-mixers, and v) a second adder operable to multiplex said quadrature signals down-converted by the second and fourth down-mixers.

3. The communication receiver according to claim 2, wherein said baseband processing module comprises i) first and second analog to digital converters for respectively converting said in-phase and quadrature multiplexed down-converted RF signals into said in-phase and quadrature multiplexed digital signals, ii) a sequence generation means operable to generate digital versions of said first and second analog code sequences, iii) a despreading means operable to deliver said first and third despreaded in-phase signals and said second and fourth despreaded quadrature signals from said in-phase and quadrature multiplexed digital signals and said first and second digital code sequences, iv) at least first and second rake receivers fed respectively with said first and third despreaded in-phase signals and the second and fourth despreaded quadrature signals in order to descramble, despread and demodulate signals received and downconverted from each antenna, v) a maximal ratio combiner connected to the output of said first and second rake receivers in order to combine signals demodulated from each antenna in a maximal ratio manner, and vi) an outer receiver connected to the output of said maximal ratio combiner and operable to apply final error correction schemes and for demultiplexing associated control channels.

4. The communication receiver according to claim 3, wherein said space diversity generator comprises first and second filters connected to the outputs of said first and second digital to analog converters and operable to remove aliases products.

5. The communication receiver according to claim 4, wherein said space diversity generator comprises an internal voltage control oscillator and a PLL loop filter for controlling the level of said local oscillator signal delivered by said local oscillator generator.

6. The communication receiver according to claim 3, wherein said despreading means comprises i) a first digital multiplier comprising a first input connected to the output of said first analog to digital converter, a second input connected to an output of a first generator of said sequence generation means for receiving said first digital code sequence, and an output for delivering said first despreaded and demultiplexed in-phase signal, ii) a first integrate and dump stage comprising an input connected to the output of said first digital multiplier and an output, iii) a second digital multiplier comprising a first input connected to the output of said second analog to digital converter, a second input connected to an output of said first generator for receiving said first digital code sequence, and an output for delivering a second despreaded and demultiplexed quadrature signal, iv) a second integrate and dump stage comprising an input connected to the output of said second digital multiplier and an output, v) a third digital multiplier comprising a first input connected to the output of said first analog to digital converter, a second input connected to an output of a second generator of said sequence generation means for receiving said second digital code sequence, and an output for delivering said third despreaded and demultiplexed in-phase signal, vi) a third integrate and dump stage comprising an input connected to the output of said third digital multiplier and an output, vii) a fourth digital multiplier comprising a first input connected to the output of said second analog to digital converter, a second input connected to an output of said second generator for receiving said second digital code sequence, and an output for delivering said fourth despreaded and demultiplexed quadrature signal, and viii) a fourth integrate and dump stage comprising an input connected to the output of said fourth digital multiplier and an output.

7. The communication receiver according to claim 6, wherein said despreading means comprises i) first and second delay means inserted respectively between the output of said first and second generators and the second output of said first and second digital multipliers and said third and fourth digital multipliers, said despreading means operable to align in the time-domain the codes of said first and second code sequences, and ii) a correlation peak detector for triggering said time alignment in order the peaks delivered by the outputs of said first and second integrate and dump stages exceed a predetermined threshold.

8. The communication receiver according of claim 3, wherein said sequence generation means comprises digital FIR filters operable respectively to carry out an RRC filtering on said first and second digital code sequences.

9. The communication receiver according to claim 2, wherein said baseband processing module comprises at least first and second digital to analog converters operable to convert respectively said first and second code sequences generated by said sequence generation means into said first and second analog code sequences.

10. The communication receiver according to claim 2, wherein said space diversity generator comprises i) a local oscillator generator operable to deliver a local oscillator signal, ii) a divider operable to divide by 2 said local oscillator signal in order to output two local oscillator signals in quadrature onto first and second outputs, iii) a fifth mixer comprising a first input connected to the first output of said divider to be fed with said in-phase local oscillator signal, a second input for receiving said first analog code sequence, and an output to deliver said first in-phase local oscillator spread signal, iv) a sixth mixer comprising a first input connected to the second output of said divider to be fed with said quadrature local oscillator signal, a second input for receiving said first analog code sequence, and an output to deliver said first quadrature local oscillator spread signal, v) a seventh mixer comprising a first input connected to the first output of said divider to be fed with said in-phase local oscillator signal, a second input for receiving said second analog code sequence, and an output to deliver said second in-phase local oscillator spread signal, and vi) an eighth mixer comprising a first input connected to the second output of said divider to be fed with said quadrature local oscillator signal, a second input for receiving said second analog code sequence, and an output to deliver said second quadrature local oscillator spread signal.

11. The communication receiver according to claim 1, wherein said RF processing module comprises i) a third amplifier comprising an input connected to the output of said first down-mixer and an output connected to said first adder, ii) a fourth amplifier comprising an input connected to the output of said second down-mixer and an output connected to said second adder, iii) a fifth amplifier comprising an input connected to the output of said third down-mixer and an output connected to said first adder, and iv) a sixth amplifier comprising an input connected to the output of said fourth down-mixer and an output connected to said second adder.

12. The communication receiver according to claim 11, wherein said baseband processing module comprises an automatic gain control module operable to control the amplification gains of said seventh and eighth amplifiers.

13. The communication receiver according to claim 1, wherein said RF processing module comprises i) a first process module comprising an input connected to the output of said first adder and an output, and operable to carry out a channel filtering and a DC compensation loop onto said in-phase multiplexed signal outputted by said first adder, ii) a seventh amplifier comprising an input connected to the output of said first process module and an output, said seventh amplifier operable to amplify said in-phase multiplexed signal outputted by said first process module, iii) a second process module comprising an input connected to the output of said second adder and an output, said second process module operable to carry out a channel filtering and a DC compensation loop onto said quadrature multiplexed signal outputted by said second adder, and iv) an eighth amplifier comprising an input connected to the output of said second process module and an output, said eighth amplifier operable to amplify said quadrature multiplexed signal outputted by said second process module.

14. The communication receiver according to claim 1, wherein said baseband processing module comprises i) first and second analog to digital converters for respectively converting said in-phase and quadrature multiplexed down-converted RF signals into said in-phase and quadrature multiplexed digital signals, ii) a sequence generation means operable to generate digital versions of said first and second analog code sequences, iii) a despreading means operable to deliver said first and third despreaded in-phase signals and said second and fourth despreaded quadrature signals from said in-phase and quadrature multiplexed digital signals and said first and second digital code sequences, iv) at least first and second rake receivers fed respectively with said first and third despreaded in-phase signals and the second and fourth despreaded quadrature signals in order to descramble, despread and demodulate signals received and downconverted from each antenna, v) a maximal ratio combiner connected to the output of said first and second rake receivers in order to combine signals demodulated from each antenna in a maximal ratio manner, and vi) an outer receiver connected to the output of said maximal ratio combiner and operable to apply final error correction schemes and for demultiplexing associated control channels.

15. The communication receiver according to claim 1 wherein the communication receiver is associated with communication equipment.

16. A method for processing received signals, the method comprising:
receiving a plurality of Radio Frequency (RF) signals at respectively a plurality of antennas;
down-converting each received RF signal using an in-phase and quadrature local oscillator signal forming a plurality of down-converted in-phase signals and a plurality of down-converted quadrature signals;
multiplexing the plurality of down-converted in-phase signals;
multiplexing the plurality of down-converted quadrature signals;
converting said plurality of down-converted in-phase signals and said plurality of down-converted quadrature signals into a plurality of in-phase multiplexed digital signals and a plurality of quadrature multiplexed digital signals;
producing despread and demultiplexed in-phase signals and despread and demultiplexed quadrature signals; and retrieving data from said despread and demultiplexed in-phase signals and from despread and demultiplexed quadrature signals.

17. The method of claim 16 wherein said in-phase and quadrature local oscillator signal is spread with an analog code sequence.

18. The method of claim 16 wherein said in-phase and quadrature local oscillator signal for each of the plurality of received RF signals is generated by a space diversity generator.

* * * * *